(12) United States Patent
Rosenberg et al.

(10) Patent No.: US 8,512,506 B2
(45) Date of Patent: Aug. 20, 2013

(54) POLYURETHANE ADHESIVE FOR WINDSHIELD APPLICATIONS

(75) Inventors: Steven A. Rosenberg, Succasunna, NJ (US); Hong Yao, Boonton, NJ (US); Thomas Bove, Rahway, NJ (US); Adrian Van Maurik, Zurich (CH); Hans Peter Tschan, Moriken (CH); Norman Blank, Uster (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 12/974,879

(22) Filed: Dec. 21, 2010

(65) Prior Publication Data

US 2011/0168321 A1    Jul. 14, 2011

Related U.S. Application Data

(63) Continuation of application No. 11/790,572, filed on Apr. 26, 2007, now abandoned, which is a continuation of application No. 10/144,803, filed on May 15, 2002, now Pat. No. 7,226,523.

(60) Provisional application No. 60/290,673, filed on May 15, 2001.

(51) Int. Cl.
| | |
|---|---|
| *B60J 1/00* | (2006.01) |
| *E06B 3/00* | (2006.01) |
| *E06B 5/00* | (2006.01) |
| *E06B 7/00* | (2006.01) |
| *C04B 37/00* | (2006.01) |
| *C09J 4/00* | (2006.01) |
| *C09J 101/00* | (2006.01) |
| *C09J 201/00* | (2006.01) |
| *C08G 18/08* | (2006.01) |
| *C08G 18/18* | (2006.01) |
| *C08G 18/00* | (2006.01) |

(52) U.S. Cl.
USPC .......... 156/325; 156/108; 156/331.7; 528/53; 528/77

(58) Field of Classification Search
USPC ............... 156/108, 325, 331.7; 528/53, 77
See application file for complete search history.

(56) References Cited

U.S. PATENT DOCUMENTS

| | | |
|---|---|---|
| 4,780,520 A | 10/1988 | Rizk et al. |
| 5,091,497 A | 2/1992 | Grogler et al. |
| 5,852,103 A | 12/1998 | Bhat |
| 5,869,593 A | 2/1999 | Helmeke et al. |
| 5,922,809 A | 7/1999 | Bhat et al. |
| 6,133,398 A | 10/2000 | Bhat et al. |
| 6,221,978 B1 | 4/2001 | Li et al. |

FOREIGN PATENT DOCUMENTS

| | | |
|---|---|---|
| CA | 2197598 A1 | 8/1997 |
| WO | WO 96/35734 A1 | 11/1996 |

OTHER PUBLICATIONS

Search Report issued in European Application No. EP 02736766, filed May 17, 2005.

*Primary Examiner* — Michael Orlando
(74) *Attorney, Agent, or Firm* — Buchanan Ingersoll & Rooney PC

(57) ABSTRACT

An automotive windshield replacement method which includes: a) applying an adhesive to an automotive windshield and/or an automobile body substrate, said adhesive including at least one urethane prepolymer formed from reaction materials including: i) isophorone diisocyanate and/or 4,4'-diphenylmethanediisocyanate; ii) an ethylene oxide-end-capped triol having a weight average molecular weight of about 4500 to about 5000; and iii) hexanediol adipate; b) contacting the substrates together, within the working time of the adhesive, along at least a portion of the substrate(s) to which the adhesive has been applied; and c) allowing the adhesive to bond the substrates together.

15 Claims, No Drawings

POLYURETHANE ADHESIVE FOR WINDSHIELD APPLICATIONS

CROSS REFERENCE TO RELATED APPLICATIONS

This application is a continuation of application Ser. No. 11/790,572, filed Apr. 26, 2007, now abandoned, which is a continuation of application Ser. No. 10/144,803 filed May 15, 2002, now U.S. Pat. No. 7,226,523, which claims the benefit of priority under 35 U.S.C. §119(e) of U.S. Provisional Application No. 60/290,673, filed May 15, 2001, the entire content of each of which is incorporated herein by reference.

BACKGROUND OF THE INVENTION

1. Field of the Invention

The present invention relates to polyurethane adhesives which are useful in bonding porous and nonporous surfaces and to a method of bonding two or more substrates together with a polyurethane adhesive. More particularly, the present invention relates to polyurethane adhesive which are especially useful in bonding windshield glass into an automotive frame under varied environmental conditions and to a method of bonding windshield glass to an automotive frame using a polyurethane adhesive.

2. Brief Description of Art

A variety of adhesives, including polyurethanes, are useful for bonding to porous and non-porous substrates (see, e.g., U.S. Pat. Nos. 4,374,237, 4,687,533, 5,603,798, 5,672,652 and 5,852,103, each of which is incorporated herein by reference). Polyurethane adhesive compositions typically comprise at least one polyurethane prepolymer. Both one and two-part polyurethanes are known and may be used to bond a variety of substrates, including glass to metal.

In general, two-component urethane adhesive systems can provide curing which is less dependent upon weather condition than one-component urethane adhesive systems. For this reason, a two-component system is generally thought to have more flexibility under a variety of application conditions, especially during the winter as compared with a one-part urethane adhesive.

Two-part urethane adhesives, however, typically require special application equipment. For example, a special application gun with an electrically powered mixing mechanism which mixes the two parts in a specific ratio prior to application may be required. Such applicators are more difficult and costly to use than applicators for one-part urethane adhesives. Further, the improper mixing of two-component urethane system can result in poor final physical properties of the adhesives and even in poor adhesion. The use of a two-part system at high temperature may also be disadvantageous since a too rapid initial cure may provide such a urethane adhesive with a short working time.

In comparison, a one-part urethane adhesive provides improved ease of use since moisture cures the adhesive without any added mechanical mixing. Conventional one-part polyurethane adhesives are strongly dependent on the environmental conditions because of the need for such moisture curing. Hardening and in turn the amount of time needed before an adhesive product may be used are therefore affected by weather conditions. This is particularly true in the winter time where low temperature and low humidity conditions reduce the curing rate of one-component polyurethane adhesives no matter what kind of catalyst and how much of it is used in the formulation. In addition, using too much strong catalyst usually adversely impacts storage stability and can also dramatically shorten the working time at high temperature and high humidity conditions.

The use of thermoplastic materials in polyurethanes for one-part adhesives further allows easy application at elevated temperatures and improved green strength once the material cools down. One example of the use of thermoplastic materials in polyurethane-based adhesives is Hot-Melt Thermoplastic Urethane Elastomers (Hot Melt TPU). See, e.g., U.S. Pat. No. 5,936,018. Thermoplastic urethanes (TPU) are reacted and neutral materials, which need high temperatures (usually >100° C.) to become soft/viscous and have very fast setting times (usually a few seconds to several minutes). Another example of a reactive hot-melt material is an isocyanate group end-capped urethane prepolymer comprising thermoplastic polyester-polyol (e.g., see EP 0-909-771 A1).

In the automotive after-market replacement industry, glass may be bound into automobiles through the use of either one-part or two-component curable polyurethane adhesives. Two-part polyurethane adhesives may be used since they offer rapid initial cure allowing for rapid drive-away times. Two-part polyurethane adhesives are well known for this application; see, e.g., U.S. Pat. Nos. 4,835,012, 5,672,652 and 5,852,137, incorporated herein by reference.

Despite the relatively rapid drive-away times afforded by two-part polyurethane adhesives, faster curing polyurethane adhesives which allow even faster drive-away times are in demand. For instance, safe drive-away times of about 60 minutes or less from application, and more preferably about 30 minutes or less from application, are preferred. However, a trade-off exists between cure time, adhesive strength and working time, generally defined as the period from application of an adhesive until the adhesive becomes too intractable to work with. For example, if an adhesive cures too rapidly, a window installer may lose the necessary time to install and properly place the glass into the frame before the adhesive becomes too intractable to work with. For these reasons, the minimum working time for such windshield replacements is about 6 to 12 minutes.

A one-part moisture curable polyurethane is preferably used when glass is installed in automobiles since the equipment needed for the application of such an adhesive in an either automobile assembly plant or as an after market replacement is less expensive than the equipment needed to apply a two-component adhesive. One part polyurethane adhesives are disclosed in U.S. Pat. Nos. 4,374,237, 4,687,533, 5,922,809, 6,133,395 and 6,133,398, the disclosures of which are herein incorporated by reference.

Generally, thermoplastic urethanes, either TPU's or prepolymers, will boost both green strength, which is desired, and the compression force required to install such a windshield, which is not desired. As mentioned above, higher green strength may shorten safe drive-away times, but higher compression forces required to install the windshield may shorten the working time.

Federal Transportation Agency regulations require windshields to remain in place at crashes of up to 30 mph (48 km/h). Federal Motor Vehicle Safety Standards (FMVSS) 208, 212 and 216 describe certain requirements which are pertinent to automotive windshield replacements. In particular, these standards set forth the minimum performance characteristics required of a windshield retention system. To meet such standards, it has been shown through crash studies of the forces on a windshield, both due to deceleration and airbag impact on the windshield, that a tensile strength of the adhesive should be preferably at least about 145 psi (1.0 MPa) at the designated drive away time measured at a strain rate of 1 meter/second.

For at least the above reasons, it is desirable to provide a one-part polyurethane adhesive which facilitates faster safe drive-away times, which meets the strength requirements to allow for the safe replacement of automotive windshields and which still provides for a reasonable working time to facilitate proper placement of glass in window frames.

OBJECTS AND SUMMARY OF THE INVENTION

It is a general object of the invention to provide a polyurethane adhesive which is useful in bonding porous and non-porous surfaces. The adhesive is especially useful in bonding windshield glass into automotive frames under a variety of environmental conditions, particularly in after-market windshield replacement applications. The polyurethane includes at least one urethane prepolymer which is based on at least one thermoplastic polyol.

In one embodiment, the urethane prepolymer may be formed from the reaction product of:

A) one or more polyisocyanates, preferably one diisocyanate;

B) one or more liquid polyetherpolyols; preferably an ethylene oxide end capped triol of relatively large molecular weight and/or one propylene oxide (PO) end capped triol having a relatively small molecular weight, or a polypropylene glycol; and C) and one or more thermoplastic polyesterpolyols;

wherein the prepolymer has a free isocyanate content of from about 0.6 to about 3.5% by weight, preferably from about 0.9 to about 2.5% by weight, based on the weight of the polyurethane.

In another embodiment, the urethane prepolymer may be formed from the reaction product of:

A) one or more polyisocyanates, preferably one diisocyanate;

B) two or more liquid polyetherpolyols; preferably an ethylene oxide end capped triol of relatively large molecular weight and one propylene oxide (PO) end capped triol having a relatively small molecular weight, or a polypropylene glycol; and C) and two or more thermoplastic polyesterpolyols;

wherein the prepolymer has a free isocyanate content of from about 0.6 to about 3.5% by weight, preferably from about 0.9 to about 2.5% by weight, based on the weight of the polyurethane.

In another embodiment, a one-part adhesive composition is provided which includes:

A) an isocyanate-functional and thermoplastic polyurethane prepolymer having a free isocyanate content of from about 0.6 to about 3.5% by weight, preferably from about 0.9 to about 2.5% by weight, based on the weight of the polyurethane; and B) one or more catalysts which are capable of catalyzing the reaction of isocyanate moieties with isocyanate-reactive moieties while providing less temperature dependent catalyzing of the reaction between isocyanate moieties and water.

In yet another embodiment, a one-part adhesive composition is provided which includes:

A) an isocyanate-functional and thermoplastic polyurethane prepolymer having a free isocyanate content of from about 0.6 to about 3.5% by weight, preferably from about 0.9 to about 2.5% by weight, based on the weight of the polyurethane; and B) a combination of several catalysts which are capable of catalyzing the reaction of isocyanate moieties with isocyanate-reactive moieties while providing less temperature dependent catalyzing of the reaction between isocyanate moieties and water.

A process for bonding two or more substrates together utilizing the polyurethane adhesive is also provided by the invention. This process comprises contacting an adhesive composition of the invention (preferably at elevated temperature) with at least one of the substrates and contacting the substrates together, before the applied adhesive cures, along the portion of the substrate(s) to which the adhesive has been applied, and allowing the adhesive to cure and bond the substrates together.

In another embodiment the thermoplastic prepolymer of this invention has a working time which will allow for the replacement of an automotive windshield. Preferably the working time is about 6-15 minutes, more preferably about 8-12 minutes. In automotive windshield replacement applications, the polyurethane adhesive allows for a sufficient working time and development of green strength to provide a safe drive-away time within about 1 hour or less from application, preferably about 30 minutes or less from application, at a temperature from about 0 to about 100° F. It is preferred that the tensile strength of the polyurethane adhesive be at least about 115 psi (0.8 MPa) or greater, more preferably about 145 psi (1.0 MPa) or greater, measured at a strain rate of 1 meter/second under a variety of temperature and humidity conditions.

DETAILED DESCRIPTION OF THE PREFERRED EMBODIMENTS OF THE INVENTION

In general, the diisocyanate compound used as a co-reactant in the preparation of the urethane prepolymer may be selected from those commonly accepted for the manufacture of urethane resins. Specific examples include 2,4-toluene diisocyanate, 2,6-toluene diisocyanate, phenylene diisocyanate, xylene diisocyanate, diphenylmethane-4,4'-diisocyanate, naphthalene-1,5-diisocyanate and hydrogenates thereof, methylene diisocyanate, ethylene diisocyanate, propylene diisocyanate, tetramethylene diisocyanate, hexamethylene diisocyanate, isophorone diisocyanate, 1-methyl-2,4-diisocyanate cyclohexane, 1-methyl-2,6-diisocyanate cyclohexane, dicyclohedxthylmethane diisocyanate, triphenylmethane triisocyanate and the like. These compounds may be used alone or in combination.

Polyols useful in the preparation of the prepolymers include, for example, polyether polyols, polyester polyols, poly(alkylene carbonate)polyols, hydroxyl-containing polythioethers, polymer polyols, and mixtures thereof. Polyether polyols are well-known in the art and include, for example, polyoxyethylene, polyoxypropylene, polyoxybutylene, and polytetramethylene ether diols and triols which are prepared by reacting an unsubstituted or halogen- or aromatic-substituted alkylene oxide with an initiator compound containing two or more active hydrogen groups such as water, ammonia, a polyalcohol, or an amine. Such methods are described, for example, in U.S. Pat. Nos. 4,269,9945; 4,218,543; and 4,374,210; which are herein incorporated by reference in their entirety. In general, polyether polyols may be prepared by polymerizing alkylene oxides in the presence of an active hydrogen-containing initiator compound.

Suitable alkylene oxides may include, e.g., ethylene oxide, propylene oxide, butylene oxides, styrene oxide, epichlorohydrin, epibromohydrin, and mixtures thereof. Suitable initiator compounds may include, e.g., water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

The thermoplastic materials according to the invention are so-called "warm-melt" materials with flowing and re-solidification points which are usually below 100° C., preferably below 80° C., more preferably below 70° C., and most preferably below 60° C.

Both crystal and amorphous polyesters may be used as thermoplastic materials in the polyurethanes of the invention.

The "working time" (sometimes also referred to as "open time" or "setting time") of a windshield repair adhesive is defined as the period from application of adhesive onto the surfaces to be bonded until the adhesive becomes too intractable to work with. An adhesive is generally too intractable to work when that the material becomes too hard to press or to re-adjust the windshield position, or the surface of the adhesive has cured sufficiently producing a surface skin so that windshield can no longer be bound into the automobile body. The working times of windshield repair adhesives according to the invention are preferably about 6-15 minutes, and more preferably about 8-12 minutes.

The working time may also be described quantitatively based upon the tack free time of the surface of the adhesive and the compression force of the adhesive. The tack free time is the amount of time for a skin to develop on the surface of the adhesive. A standard drying measurement technique, typically at 73° F. and 50% relative humidity, is generally utilized to record the tack free time as the time period until a needle dragged across the surface of an adhesive applied onto a glass strip produces a ripple in the adhesive. The tack free time has a bearing on the working time since the bonding of an adhesive bead is generally reduced or prevented following the development of a skin layer. The compression force of the adhesive refers to the amount of force required to press two substrates together following application of an adhesive bead to at least one of the surfaces such that the adhesive is capable of being compressed and the substrates properly bonded. The compression force has a bearing on the working time, particularly for windshield installation applications, since an adhesive that requires too high a compression force may not allow an installer to achieve a proper bond meeting Federal Motor Vehicle Safety Standards. In general, the compression force of a polyurethane adhesive bead for windshield installation (measured at 5° C. and after 10 minutes from application of a bead of the adhesive to a substrate) should be less than about 0.25 MPa, preferably less than about 0.18 MPa and more preferably less than about 0.1 MPa. The working time is the lesser of the tack free time and the adhesive curing time which results in an adhesive bead compression force of less than about 0.25 MPa, preferably less than about 0.18 MPa and more preferably less than about 0.1 MPa.

The term "Safe Drive-Away Time" (SDAT), as defined herein, is the time period from which a windshield is bound onto an automobile body until the adhesive becomes so strong that the windshield would remain in place in case the automobile crashes at a speed of up to 30 mph (48 km/h) according to U.S. Federal Motor Vehicle Safety Standards (FMVSS 208, 212 and 216). To meet such a standard, the tensile strength of the adhesive at the designated drive-away time should preferably be about 115 psi (0.8 MPa) or greater, more preferably about 145 psi (1.0 MPa) or greater when measured at a test speed (strain rate) of 1 meter/second. The polyurethane adhesive compositions according to the invention provide Safe Drive-Away Times at temperatures from about 0 to about 100° F. (−32 to 37.8° C.) over a variety of humidity conditions.

It is preferred that the polyurethane adhesive compositions according to the invention have a tensile strength at the designated drive-away time of about 115 psi (0.8 MPa) or greater, more preferably about 145 psi (1.0 MPa) or greater when measured at a test speed (strain rate) of 1 meter/second and a compression force (measured at 5° C. and after 10 minutes from application of a bead of the adhesive to a substrate) of less than about 0.25 MPa, preferably less than about 0.18 MPa and more preferably less than about 0.1 MPa.

In the practice of the invention, there may be used various additives commonly known in the art which include plasticizers, fillers, thixotropic agents, tackifiers, catalysts, ultra-violet absorbers, dyes, pigments, flame retardants and the like. Typical plasticizers are chosen from derivatives of benzoic acid, phthalic acid (e.g. phthalates, such as dibutyl-, dioctyl-, dicyclohexyl-, diisooctyl-, diisodecyl-, dibenzyl- or butylbenzylphthalate), trimellitic acid, pyromellitic acid, adipic acid, sebacic acid, fumaric acid, maleic acid, itaconic acid and citric acid and of polyester, polyether and epoxy and the like. Suitable fillers include silicic acid derivatives, talc, metallic powder, calcium carbonate, clay, carbon black among others. Thixotropic agents typically include bentonite, anhydrous silicic acid, urea derivatives and the like. Suitable catalysts include dibutyltin dilaurate, dioctyltin dilaurate, zinc octylate, organic bismuth compounds, triethylenediamine, amine compounds such as morpholine amine and the like. Examples of such catalysts are disclosed in U.S. Pat. Nos. 5,922,809, 6,133,395 and 6,133,398, herein incorporated by reference. Combinations of catalysts may also be used, preferably a combination of one or more dialkyl tin compounds such as a dialkyltin dicarboxylates, more preferably dibutyltin dilaurate and one or more amine compounds, such as a dimorpholinodiaklkylethers and/or dimorpholino substituted polyalkylene glycols.

Preferably these additional components are present in the following ranges:

the at least one plasticizer, preferably in an amount from about 10 to about 25 percent by weight, more preferably from about 15 to about 20 percent by weight and/or the at least one filler, preferably in an amount from about 5 to about 50 percent by weight, especially in an amount from about 8 to about 15 percent by weight, and/or the at least one additive, preferably in an amount from about 0.001 to about 5 percent by weight, whereby said percentages are with reference to the total polyurethane adhesive mixture.

Further auxiliary agents or additives may be included, selected from:

adhesion promoters, especially silane-containing compounds, which may additionally contain at least one reactive group, such as epoxy-, isocyanate-, amine groups or double bonds, dyes or pigments, polyurethane catalysts, such as lead and/or tin and/or other metal compounds, occasionally combined with the use of further polyurethane catalysts, especially of tertiary amine-containing catalysts, UV-absorbing agents or stabilizers, such as phenolic anti-oxidants and screening agents.

Preferred polyurethane prepolymers of the present invention are those formed of the following components:

a) aromatic diisocyanates, such as, e.g., 4,4'-diphenyl-methanediisocyanate, 2,4-toluene-diisocyanate, naphthylene-1,5-diisocyanate, 1,3- and 1,4-phenylenediisocyanate, and/or b) aliphatic or cycloaliphatic diisocyanates, such as hex-amethylene-diisocyanate, 1,12-dodecanediisocyanate, cyclobutane-1,3-diisocyanate, cyclohexane 1,3- and -1,4-diisocyanate, 1-isocyanato-3,3,5-trimethyl-5-isocyanatemethylcyclohexane, 2,4- and 2,6-hexahydrotoluene-diisocyanate, hexahydro-1,3- and -1,4-phenyldiisocyanate, perhydro-2,4' and -4,4' diphenylmethane-diisocyanate, and c) polyols having a molecular weight range from about 400 to about 10,000, preferably from about 1000 to about 5000, such as e.g. linear or branched polybutadienes,
polycarbonates,
polycaprolactones,
polycaprolactams,
polyethers, e.g., polyethylene oxides, polypropylene oxides, polybutylene oxides, polystyrene oxides, polyepichlorohydrines, polytetrahydrofuranes,
polyesters, e.g., any condensation products of multivalent alcohols (e.g. ethylene-glycol, propyleneglycol-1,2 and -1,3, butylene-glycol-1,4 and -2,3, hexanediol-1,6, octanediol-1,8, trimethylolpropane, neopentylglycol, glycerol, pentaerythritol, quinitol, mannitol, sorbitol, methylglycoside, diethylene glycol, polyethylene glycols, dipropylene glycol, polypropylene glycols with multivalent carboxylic acids and/or carboxylic acid anhydrides and/or carboxylic esters), e.g., succinic acid, adipic acid, octanedioic acid, azelaic acid, sebacic acid, phthalic acid, isophthalic acid, trimellitic acid, phthalic acid anhydride, tetrahydrophthalic acid anhydride, tetrachlorophthalic acid anhydride, glutaric acid anhydride, maleic acid anhydride, fumaric acid, terephthalic acid-dimethylester and terephthalic acid-bis-glycol-ester, each having terminal, primary and/or secondary OH-groups, whereby the OH-functionality is preferably in the range of around 2, and/or d) short chain diols with terminal, primary and/or secondary OH-groups, such as, e.g., ethylene-glycol, bis-hexanediol-1,6,-propylene glycol, bis-hexapropylene glycol, diethyleneglycol, bis-hexaethylene-glycol.

It is particularly preferred that one or more liquid polyetherpolyol be utilized. Preferably the polyetherpolyol includes an ethylene oxide end-capped triol and a propylene oxide end-capped triol or a polypropylene glycol. It is also preferred that the ethylene oxide end-capped triol preferably have a weight average molecular weight of from about 4500 to about 5000 and that the propylene oxide end-capped triol have a weight average molecular weight of from about 150 to about 250. The polypropylene glycol preferably has a weight average molecular weight of from about 3500 to about 4500.

The polyurethane adhesive may be used to bond or seal the following:

any glass, especially glass plates for use in automotive vehicles, composite glass plates, front walls of glass, any metal, which may be varnished, metallized or otherwise coated and/or pretreated, e.g., bodies of automotive vehicles, any metal alloy, which may be varnished, metallized or otherwise coated and/or pretreated, e.g., bodies of automotive vehicles, any plastic, any construction material, especially stones, concrete, mortar, road pavings, and any wood material.

In addition to the direct application of the polyurethane adhesive, the adhesive composition may also be shaped, for instance, with the aid of an applicator or extruder, to a profile of any shape, such as, e.g., a cord, a ribbon, etc. For dimensional stability there may be incorporated into the cord or the ribbon a thread or a screen of any material. Such cords may be spirally wound and may be stored in a water vapor barrier bag for later use. These preformed cords may then be applied manually without the use of machines to bond the above materials.

The following example shall illustrate the invention. The parts mentioned herein are referred to by weight.

EXAMPLES

The following examples illustrate the preparation of the polyurethane prepolymers according to the invention, adhesive formulations prepared from the prepolymers and property characteristics of the adhesives.

A. Formulation, Preparation Procedure and Characterization of Polyurethane Prepolymers and Thixotropic Agent:

1) Prepolymer I

| | |
|---|---|
| 68.585 parts | Ethylene oxide (EO) end capped glycerol poly-(oxypropylene)triol w/ OH# ~34-36 (EO-triol, Arcol ® E-448 from Bayer) |
| 19.995 parts | plasticizer diisodecyl phthalate (Jayflex ® DIDP from Exxon) |
| 11.387 parts | Methylene bisphenyl diisocyanate (MDI, Mondur M from Bayer) |
| 0.016 parts | 33% Triethylenediamine in Dipropyleneglycol (DABCO ® 33 LV catalyst from Air Products) |
| 0.017 parts | p-Toluensulfonyl isocyanate (PTSI from VanChem Inc.) |

The EO-triol, plasticizer and catalyst were combined in a reactor and the mixture heated up to 60° C. under vacuum. MDI was then added and mixed at 60° C. under vacuum until the MDI melted. The mixture was then heated to 80° C. and the reaction continued at 80° C. until the free NCO content reached ~2.5% by weight. PTSI was then added to stop further reaction.

The prepolymer had a theoretical final free NCO content of 2.4% and a viscosity of 10,000-40,000 centipoise at 23° C. as measured with a Brookfield Viscometer HBTD by using a spindle number 5 at 100 rpm.

2) Prepolymer II

| | |
|---|---|
| 60.000 parts | Hexanediol adipate with OH number ~34 (Polyester-diol, Dynacoll ® 7360 from Degussa) |
| 10.000 parts | plasticizer diisodecyl phthalate (Jayflex ® DIDP from Exxon) |
| 18.000 parts | Polypropylene glycol with OH number ~28 (PO-diol, Acclaim ® 4200 from Bayer) |
| 12.000 parts | Methylene bisphenyl diisocyanate (MDI, Mondur M from Bayer) |

The shredded polyester-diol, plasticizer and PO-diol were combined in a reactor and the mixture heated up to 80° C. under vacuum until the polyester-diol melted. MDI was then added and mixed at 80° C. The mixture was held at 80° C. while stirring under vacuum until the free NCO content reached ~2.3% by weight. The prepolymer had a theoretical final free NCO content of 2.1% and a viscosity of 20,000-40,000 centipoise at 60° C. as measured with a Brookfield Viscometer HBTD by using a spindle number 5 at 100 rpm.

3) Prepolymer III

| | |
|---|---|
| 64.282 parts | Ethylene oxide (EO) end capped glycerol poly-(oxypropylene)triol w/ OH# ~34-36 (EO-triol, Arcol ® E-448 from Bayer) |

-continued

| 23.772 parts | Polypropylene glycol with OH number ~28 (PO-diol, Acclaim ® 4200 from Bayer) |
| --- | --- |
| 0.016 parts | Dibutyltin dilaurate (DABCO ® T-12 catalyst from Air Products) |
| 11.930 parts | Isophorone diisocyanate (IPDI, Desmodur I from Bayer) |

The EO-triol, PO-diol and catalyst were combined in a reactor and the mixture heated up to 60° C. under vacuum. IPDI was then added and mixed at 60° C. The mixture was then heated to 80° C. and the reaction continued at 80° C. until the free NCO content reached ~2.2% by weight.

The prepolymer had a theoretical final free NCO content of 2.1% and a viscosity of 5,000-20,000 centipoise at 23° C. as measured with a Brookfield Viscometer HBTD by using a spindle number 5 at 100 rpm.

4) Prepolymer IV

| 27.480 parts | Ethylene oxide (EO) end capped glycerol poly-(oxypropylene)triol w/ OH# ~34-36 (EO-triol, Arcol ® E-448 from Bayer) |
| --- | --- |
| 0.480 parts | Hexanediol adipate with OH number ~34 (Polyester-diol Dynacoll ® 7360 from Degussa) |
| 40.760 parts | A blended hexanediol-neopentyl glycol adipate with OH number ~34 (Blended polyester-diol Millester ® 9-35 from Polyurethane Specialties Company, Inc.) |
| 20.000 parts | plasticizer diisodecyl phthalate (Jayflex ® DIDP from Exxon) |
| 11.280 parts | Methylene bisphenyl diisocyanate (MDI, Mondur M from Bayer) |

The EO-triol, the shredded polyester-diol and blended polyester-diol and plasticizer were combined in a reactor and the mixture heated up to 80° C. under vacuum until the polyester-diol melted. MDI was then added and mixed at 80° C. The mixture was held at 80° C. while stirring under vacuum until the free NCO content reached ~2.1% by weight.

The prepolymer had a theoretical final free NCO content of 2.0% and a viscosity of 100,000-300,000 centipoise at 23° C. as measured with a Brookfield Viscometer HBTD by using a spindle number 5 at 100 rpm.

5) Prepolymer V

| 30.000 parts | Ethylene oxide (EO) end capped glycerol poly-(oxypropylene)triol w/ OH#~34-36 (EO-triol, Arcol ® E-448 from Bayer) |
| --- | --- |
| 0.200 parts | Glycerol poly(oxypropylene)triol w/ OH# ~1052 (PO-triol, Multranol ® 9133 from Bayer) |
| 0.500 parts | Hexanediol adipate with OH number ~34 (Polyester-diol, Dynacoll ® 7360 from Degussa) |
| 37.350 parts | A blended hexanediol-neopentyl glycol adipate with OH number ~34 (Blended polyester-diol, Millester ® 9-35 from Polyurethane Specialties Company, Inc.) |
| 20.000 parts | plasticizer diisodecyl phthalate (Jayflex ® DIDP from Exxon) |
| 11.950 parts | Methylene bisphenyl diisocyanate (MDI, Mondur M from Bayer) |

The EO-triol, PO-triol, the shredded polyester-diol and blended polyester-diol and plasticizer were combined in a reactor and the mixture heated up to 80° C. under vacuum until the polyester-diol melted. MDI was then added and mixed at 80° C. The mixture was held at 80° C. while stirring under vacuum until the free NCO content reached ~2.1% by weight.

The prepolymer had a theoretical final free NCO of 2.0% and a viscosity of 100,000-300,000 centipoise at 23° C. as measured with a Brookfield Viscometer HBTD by using a spindle number 5 at 100 rpm.

6) Prepolymer VI

| 51.826 parts | Ethylene oxide (EO) end capped glycerol poly(oxypropylene)triol w/ OH# ~34-36 (EO-triol, Arcol ® E-448 from Bayer) |
| --- | --- |
| 25.913 parts | Polypropylene glycol with OH number ~28 (PO-diol, Acclaim ® 4200 from Bayer) |
| 10.000 parts | plasticizer diisodecyl phthalate (Jayflex ® DIDP from Exxon) |
| 12.205 parts | Methylene bisphenyl diisocyanate (MDI, Mondur M from Bayer) |
| 0.003 parts | 33% Triethylenediamine in Dipropyleneglycol (DABCO ® 33 LV catalyst from Air Products) |
| 0.010 parts | p-Toluensulfonyl isocyanate (PTSI from VanChem Inc.) |

The EO-triol, PO-diol, plasticizer and catalyst were combined in a reactor and the mixture heated up to 60° C. under vacuum. MDI was then added and mixed at 60° C. under vacuum until the MDI melted. The mixture was then heated to 80° C. and the reaction continued at 80° C. until the free NCO content reached ~2.4% by weight. PTSI was then added to stop further reaction.

The prepolymer had a theoretical final free NCO content of 2.3% and a viscosity of 18,000-40,000 centipoise at 23° C. as measured with a Brookfield Viscometer HBTD by using a spindle number 5 at 100 rpm.

7) Prepolymer VII

| 20.000 parts | Hexanediol adipate with OH number ~34 (Polyester-diol, Dynacoll ® 7360 from Degussa) |
| --- | --- |
| 80.000 parts | Copolyester-diol with OH number ~22 (Oxyflex S 1151-22 from Oxydental Chemicals) |
| 13.572 parts | Methylene bisphenyl diisocyanate (MDI, Mondur M from Bayer) |

8) Prepolymer VIII

| 22.000 parts | Copolyester-diol with OH number ~21 (Copolyester-diol, Dynacoll ® 7250 from Degussa) |
| --- | --- |
| 14.000 parts | Copolyester-diol with OH number ~31 (Copolyester-diol, Dynacoll ® 7230 from Degussa) |
| 39.000 parts | Copolyester-diol with OH number ~42 (Copolyester-diol, Dynacoll ® 7150 from Degussa) |
| 25.000 parts | Copolyester-diol with OH number ~62 (Oxyflex S 1015-62 from Oxydental Chemicals) |
| 17.858 parts | Methylene bisphenyl diisocyanate (MDI, Mondur M from Bayer) |

9) Thixotropic agent

| 981 parts | Methylene bisphenyl diisocyanate (MDI, Mondur M from Bayer) |
| --- | --- |
| 6418 parts | plasticizer diisodecyl phthalate (Jayflex ® DIDP from Exxon) |
| 518 parts | N-butylamine |
| 12.5 parts | N-methyl-2-pyrrolidone |

B. Formulation of Polyurethane Catalyst Solutions:

1) Catalyst Solution I

| | |
|---|---|
| 78.500 parts | plasticizer diisodecyl phthalate (Jayflex ® DIDP from Exxon) |
| 8.250 parts | Dimorpholinodiethylether (Jeffcat DMDEE from Huntsman) |
| 12.250 parts | Dimorpholino substituted polyethylene glycol (Polymeg DMDEE or DMPEG from Huntsman) |
| 1.000 parts | Dibutyltin dilaurate (DABCO ® T-12 catalyst from Air Products) |

2) Catalyst Solution II

| | |
|---|---|
| 55.800 parts | plasticizer diisodecyl phthalate (Jayflex ® DIDP from Exxon) |
| 6.000 parts | Tetramethyl dimorpholinodiethylether (TM-DMDEE, U-Cat 651M from SAN-APRO) |
| 37.000 parts | Dimorpholino substituted polyethylene glycol (Polymeg DMDEE or DMPEG from Huntsman) |
| 1.200 parts | Dibutyltin dilaurate (DABCO ® T-12 catalyst from Air Products) |

3) Catalyst Solution III

| | |
|---|---|
| 45.800 parts | plasticizer diisodecyl phthalate (Jayflex ® DIDP from Exxon) |
| 9.900 parts | Tetramethyl dimorpholinodiethylether (TM-DMDEE, U-Cat 651M from SAN-APRO) |
| 42.000 parts | Dimorpholino substituted polyethylene glycol (Polymeg DMDEE or DMPEG from Huntsman) |
| 2.300 parts | Dibutyltin dilaurate (DABCO ® T-12 catalyst from Air Products) |

4) Catalyst Solution IV

| | |
|---|---|
| 51.500 parts | plasticizer diisodecyl phthalate (Jayflex@ DIDP from Exxon) |
| 4.000 parts | Tetramethyl dimorpholinodiethylether (TM-DMDEE, U-Cat 651M from SAN-APRO) |
| 42.000 parts | Dimorpholino substituted polyethylene glycol (Polymeg DMDEE or DMPEG from Huntsman) |
| 2.500 parts | Dibutyltin dilaurate (DABCO ® T-12 catalyst from Air Products) |

C. Formulation and Preparation Procedure of Polyurethane Adhesives:

1) Adhesive I

| | |
|---|---|
| 32.951 parts | Prepolymer I described above |
| 11.200 parts | Prepolymer III described above |
| 14.621 parts | Polyvinyl chloride powder (PVC, EH-250 from Kaneka) |
| 8.344 parts | Thixotropic agent described above |
| 0.257 parts | p-Toluensulfonyl isocyanate (PSTI from VanChem Inc.) |
| 16.321 parts | Carbon Black powder (Printex 60 from Degussa) |
| 5.791 parts | Prepolymer II described above |
| 8.305 parts | Plasticizer diisodecyl phthalate (Jayflex ® DIDP from Exxon) |
| 0.298 parts | Epoxysilane adhesion promoter (Silane A-187 from Osi) |
| 1.912 parts | Catalyst solution II described above |

The DIDP, Prepolymer I, Prepolymer III, PVC powders and Thixotropic agent were placed into a vacuum mixer and mixed under vacuum for 5 minutes. PSTI was then added and mixed under vacuum for 5 minutes. Carbon Black powder was next added and mixed under vacuum until the temperature reached 60° C. Previously melted Prepolymer II was then added and mixed under vacuum for 10 minutes. Silane was subsequently added and mixed under vacuum for 5 minutes, followed by the addition of Catalyst solution II and further mixing under vacuum for 5 minutes.

2) Adhesive II

| | |
|---|---|
| 59.550 parts | Prepolymer IV described above |
| 14.470 parts | Polyvinyl chloride powder (PVC, EH-250 from Kaneka) |
| 8.240 parts | Thixotropic agent described above |
| 0.500 parts | p-Toluensulfonyl isocyanate (PSTI from VanChem Inc.) |
| 15.070 parts | Carbon Black powder (Printex 60 from Degussa) |
| 0.300 parts | Epoxysilane adhesion promoter (Silane A-187 from Osi) |
| 1.870 parts | Catalyst solution III described above |

The Prepolymer IV, PVC powder and Thixotropic agent were placed into a vacuum mixer and mixed under vacuum for 5 minutes. PSTI was then added and mixed under vacuum for 5 minutes. Carbon Black powder was next added and mixed under vacuum for 10 minutes. Silane was subsequently added and mixed under vacuum for 5 minutes, followed by the addition of Catalyst solution III and further mixing under vacuum for 5 minutes.

3) Adhesive III

| | |
|---|---|
| 53.000 parts | Prepolymer IV described above |
| 4.330 parts | Plasticizer diisodecyl phthalate (Jayflex ® DIDP from Exxon) |
| 17.000 parts | Clay powder (Satintone Whitetex from Engelhard) |
| 0.500 parts | p-Toluensulfonyl isocyanate (PSTI from VanChem Inc.) |
| 23.000 parts | Carbon Black powder (Printex 60 from Degussa) |
| 0.300 parts | Epoxysilane adhesion promoter (Silane A-187 from Osi) |
| 1.870 parts | Catalyst solution III described above |

The Prepolymer IV, DIDP and Whitetex clay powder were placed into a vacuum mixer and mixed under vacuum for 5 minutes. PSTI was then added and mixed under vacuum for 5 minutes. Carbon Black powder was next added and mixed under vacuum for 10 minutes. Silane was subsequently added and mixed under vacuum for 5 minutes, followed by the addition of Catalyst solution III and further mixing under vacuum for 5 minutes.

4) Adhesive IV

| | |
|---|---|
| 59.550 parts | Prepolymer V described above |
| 14.470 parts | Polyvinyl chloride powder (PVC, EH-250 from Kaneka) |
| 8.240 parts | Thixotropic agent described above |
| 0.500 parts | p-Toluensulfonyl isocyanate (PSTI from VanChem Inc.) |
| 15.070 parts | Carbon Black powder (Printex 60 from Degussa) |
| 0.300 parts | Epoxysilane adhesion promoter (Silane A-187 from Osi) |
| 1.870 parts | Catalyst solution IV described above |

The Prepolymer V, PVC powder and Thixotropic agent were placed into a vacuum mixer and mixed under vacuum for 5 minutes. PSTI was then added and mixed under vacuum for 5 minutes. Carbon Black powder was next added and mixed under vacuum for 10 minutes. Silane was subsequently added and mixed under vacuum for 5 minutes, followed by the addition of Catalyst solution IV and further mixing under vacuum for 5 minutes.

5) Adhesive V

| | |
|---|---|
| 8.657 parts | Prepolymer III described above |
| 13.607 parts | Plasticizer diisodecyl phthalate (Jayflex ® DIDP from Exxon) |
| 31.570 parts | Prepolymer VI described above |
| 0.209 parts | Homopolymer of Hexamethylene Diisocyanate (Polymeric HDI, Desmodur N 100 from Bayer) |
| 1.771 parts | Fumed silicate powder (Aerosil ® R972 from Degussa) |
| 13.225 parts | Clay powder (Satintone Whitetex from Engelhard) |
| 5.302 parts | Low conductive carbon black powder (Monarch 120 from Cabot) |
| 13.66 parts | Carbon black powder (Elftex 125 from Cabot) |
| 0.500 parts | Prepolymer VII described above |
| 9.500 parts | Prepolymer VII described above |
| 2.000 parts | Catalyst solution I |

The Prepolymer III, DIDP, Prepolymer VI and Desmodur N 100 were placed into a vacuum mixer, and mixed under vacuum to 55° C. Aerosil and Whitetex clay powders were then added and mixed under vacuum to a homogenous mass. Carbon Black powder was next added and mixed under vacuum for 10 minutes. The fineness was then checked and, when satisfactory, previously melted Prepolymer VII and Prepolymer VIII were added and the mixture heated up to 100° C. and mixed under vacuum 10 minutes. Catalyst Solution 1 was then added and mixed under vacuum for 5 minutes.

5) Adhesive VI

SikaTack® Ultrafast II (a fast curing, one component, polyurethane wind-shield adhesive available from Sika Industry, USA).

D. Green Strength or Early Tensile Strength of Polyurethane Adhesives:

Green strength or early tensile strength properties of polyurethane adhesive compositions were measured according to the following procedure:

Adhesive materials in cartridges were placed in an oven at 80° C. for a period of one hour prior to use. Glass pieces were cleaned with Burco Glass Cleaner. After 10 minutes of flash time, Sika-Aktivator® (a moisture sensitive liquid for the pre-treatment of surfaces to improve adhesion available from Sika Industry, USA) was applied using a wipe on wipe off procedure. The Sika-Aktivator® was allowed to flash for 10 minutes. Next, the adhesive was applied hot at 80° C. to the glass and top pieces of the same size were placed on top of the adhesive bead and compressed to a thickness of 4 mm. The test specimens were then placed in respective environmental chambers at designated climate condition (temperature and humidity). Samples were taken after 1 hour to test force on gauge (FOG) at a test speed (strain rate) of 1 meter/second. After testing, the bond-line of each sample was measured, the area of fracture was calculated, and the green strength calculated (FOG/unit area). The adhesive in the same cartridge was measured five times to get an average number for the green strength. The results of these tests are shown in the Table I.

TABLE I

Green strengths for Polyurethane Adhesives at Various Cure Conditions (measured at 1 meter/second strain rate, ASTM D412)

| | Tensile Strength at break (Peak Stress, MPa) Cure Conditions (Temperature, ° C.; % relative humidity) | | |
|---|---|---|---|
| Adhesive Formulation | 1 hr @ 5° C.; 50% rh | 1 hr @ 23° C.; 50% r.h. | 1 hr @ 35° C.; 20% r.h. |
| I | 1.3 | 0.8 | 0.5 |
| II | 2.9 | 0.9 | 0.8 |
| III | 3.0 | 1.1 | 0.8 |
| IV | 2.9 | 1.1 | 1.0 |
| V | 1.6 | 1.0 | 0.7 |
| VI | 0.9 | 0.7 | 0.5 |

E. Compression Properties of Polyurethane Adhesives:

Compression force measurements were recorded on adhesive beads having a triangular cross-sectional shape. The beads were applied along the length of one flat test plate (typically glass, although other materials may be used) having dimensions of 100 mm length, 40 mm width and 4 mm thickness using a triangular bead applicator. The adhesive bead had an original height of 10 mm, a base width of 8 mm and a length of 100 mm. A second test plate was placed on top of the adhesive bead such that the faces of the two test plates were parallel and the plates were aligned in orientation. The plates were then compressed at a constant rate of 190 mm/min and the compression force recorded, typically at 5° C. and after 10 minutes from the application of the adhesive to the first test plate. The compression force per unit area was calculated by measuring the cross-sectional area of the compressed adhesive layer after the bead height had been compressed to 5 mm and dividing the force by the bead area.

The following compression force tests were performed for adhesive samples cured for 10 minutes at 5° C. by compressing the samples from 10 mm to 5 mm at a rate of 190 mm/min.:

TABLE II

Compression Force of Polyurethane Adhesives at 5° C. after 10 minutes

| Adhesive Sample Formulation | Compression Force (MPa) |
|---|---|
| I | 0.10 |
| II | 0.09 |
| III | 0.12 |
| IV | 0.17 |
| V | 0.11 |
| VI | 0.09 |

While the invention has been described in terms of preferred embodiments, the skilled artisan will appreciate that various modifications, substitutions, omissions and changes may be made without departing from the spirit thereof. Accordingly, it is intended that the scope of the present invention be limited solely by the scope of the following claims, including equivalents thereof.

What is claimed is:

1. An automotive windshield replacement method which comprises:
   a) applying an adhesive to an automotive windshield and/or an automobile body substrate, said adhesive comprising at least one urethane prepolymer formed from reaction materials comprising:

i) isophorone diisocyanate and/or 4,4'-diphenyl-methanediisocyanate;
  ii) an ethylene oxide-end-capped triol having a weight average molecular weight of about 4500 to about 5000; and
  iii) hexanediol adipate;
 b) contacting the substrates together, within the working time of the adhesive, along at least a portion of the substrate(s) to which the adhesive has been applied; and
 c) allowing the adhesive to bond the substrates together.

2. An automotive windshield replacement method according to claim 1, wherein said reaction materials further comprise at least one of a polypropylene glycol and a propylene oxide-end-capped triol.

3. An automotive windshield replacement method according to claim 2, wherein said reaction materials comprise a polypropylene glycol having a weight average molecular weight of about 3500 to about 4500.

4. An automotive windshield replacement method according to claim 1, wherein the adhesive (1) has a tensile strength of 1.0 MPa or greater when measured at a strain rate of 1 meter/second, (2) has a compression force of less than about 0.18 MPa when measured at 5° C., (3) provides a safe drive-away time according to U.S. Federal Motor Vehicle Safety Standards of one hour or less from application of the adhesive to the windshield and/or automobile body, and (4) provides a working time of about 6 to about 15 minutes.

5. An automotive windshield replacement method which comprises:
 a) applying an adhesive to an automotive windshield and/or an automobile body substrate, said adhesive comprising at least two urethane prepolymers, the first said prepolymer formed from reaction materials comprising:
  i) isophorone diisocyanate and/or 4,4'-diphenyl-methanediisocyanate, and
  ii) an ethylene oxide-end-capped triol having a weight average molecular weight of about 4500 to about 5000; and
the second said prepolymer formed from reaction materials comprising:
 i) isophorone diisocyanate and/or 4,4'-diphenylmethanediisocyanate, and
 ii) hexanediol adipate;
 b) contacting the substrates together, within the working time of the adhesive, along at least a portion of the substrate(s) to which the adhesive has been applied; and
 c) allowing the adhesive to bond the substrates together.

6. An automotive windshield replacement method according to claim 4, wherein the reaction materials of said second prepolymer comprise hexanediol adipate.

7. An automotive windshield replacement method according to claim 6, wherein the reaction materials of said first prepolymer further comprise at least one of a polypropylene glycol and a propylene oxide-end-capped triol.

8. An automotive windshield replacement method according to claim 7, wherein said reaction materials of said first prepolymer comprise a polypropylene glycol having a weight average molecular weight of about 3500 to about 4500.

9. An automotive windshield replacement method according to claim 7, wherein said reaction materials of said first prepolymer comprise a propylene oxide-end-capped triol.

10. An automotive windshield replacement method according to claim 5, wherein the reaction materials of said first prepolymer further comprise at least one of a polypropylene glycol and a propylene oxide-end-capped triol.

11. An automotive windshield replacement method according to claim 10, wherein said reaction materials of said first prepolymer comprise a polypropylene glycol having a weight average molecular weight of about 3500 to about 4500.

12. An automotive windshield replacement method according to claim 10, wherein said reaction materials of said first prepolymer comprise a propylene oxide-end-capped triol.

13. An automotive windshield replacement method according to claim 5, wherein the adhesive (1) has a tensile strength of 1.0 MPa or greater when measured at a strain rate of 1 meter/second, (2) has a compression force of less than about 0.18 MPa when measured at 5° C., (3) provides a safe drive-away time according to U.S. Federal Motor Vehicle Safety Standards of one hour or less from application of the adhesive to the windshield and/or automobile body, and (4) provides a working time of about 6 to about 15 minutes.

14. An automotive windshield replacement method according to claim 1, wherein the reaction materials for forming the urethane prepolymer further comprise a propylene oxide-end-capped triol having a weight average molecular weight of from about 150 to about 250.

15. An automotive windshield replacement method according to claim 5, wherein the reaction materials for forming the first prepolymer further comprise a propylene oxide-end-capped triol having a weight average molecular weight of from about 150 to about 250.

* * * * *